Nov. 15, 1949　　F. C. WERNER ET AL　　2,488,046
DOUGH EXTRUDING AND CUTTING MACHINE
Filed Feb. 19, 1945　　4 Sheets-Sheet 2

Inventors
Frank Charles Werner
Dick Sporte
By Liverance and
Van Antwerp
Attorneys

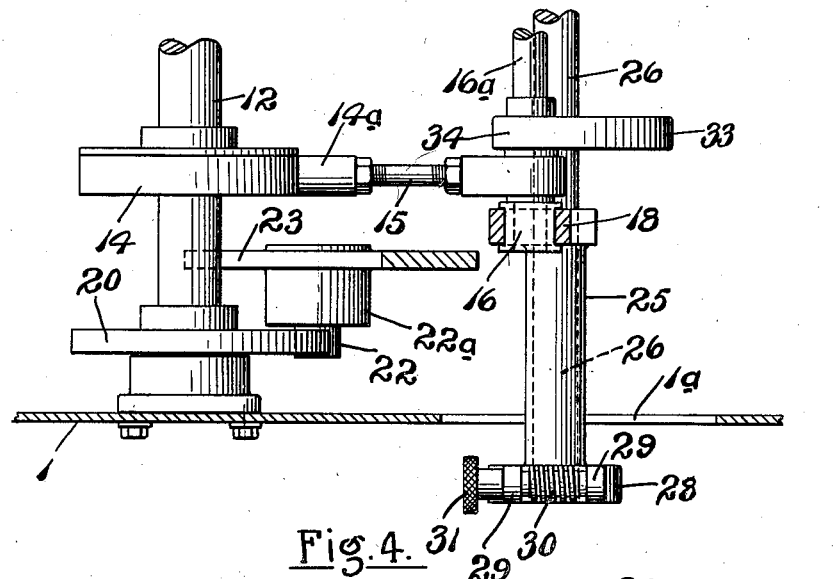
Fig. 4.
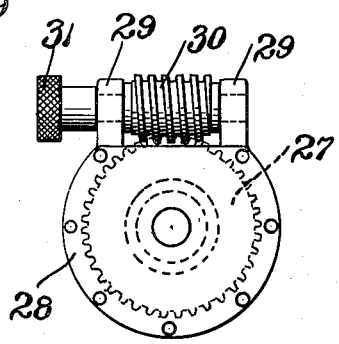
Fig. 5.
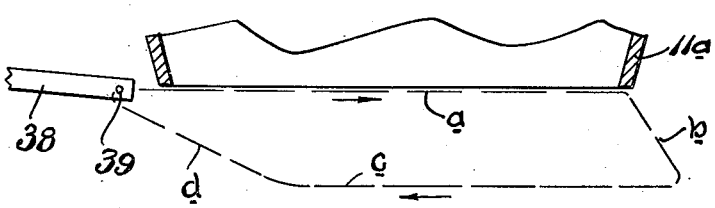
Fig. 6.
Fig. 7.
Inventors
Frank Charles Werner
Dick Sporte
By Liverance and Van Antwerp
Attorneys Patented Nov. 15, 1949

2,488,046

UNITED STATES PATENT OFFICE 2,488,046

DOUGH EXTRUDING AND CUTTING MACHINE

Frank Charles Werner and Dick Sporte, Grand Rapids, Mich.; said Sporte assignor to said Werner Application February 19, 1945, Serial No. 578,609

7 Claims. (Cl. 107—29)

The present invention is directed to a dough cutting machine and is concerned with rapidly and periodically cutting from the lower end of delivery nozzles through which cookie dough or the like is forced, the projected dough which thereupon falls by gravity to pans to receive it mounted upon a moving belt, said pans with a plurality of the rows of deposited pieces of dough in cookie form being moved continuously and upon reaching the end of the machine being transferred to a baking oven.

The invention has for its objects and purposes the construction of a machine of the type indicated which is very rapid in operation and in which, by utlizing various forms and shapes of nozzles for the dough to pass through, many and varied shapes and forms of cookies may be produced. One valuable feature of the present invention is the adaptability of the machine to operate and make the dough deposits rapidly, through novel adjusting means for speeding up the operations when the cookie shape deposits are of a smaller size, the efficiency of the machine being maintained as to the quantity of dough processed irrespective of the sizes of the cookies which are to be produced.

Further objects and purposes of the invention are directed to a novel and very practical, yet simple method of cutting the dough and returning the cutter to position for cutting succeeding dough which is being forced from the nozzles; for decreasing the cutting stroke when the dimension of the nozzle passed over is decreased, and increasing it when such dimension is increased, and for adjusting the cutting means to be in its best operative relation to the ends of the nozzles with which it is associated. Many other objects and purposes than those stated will appear as an understanding is had of the invention, taken in connection with the accompanying drawings, in which Fig. 1 is a plan view of the invention shown in its application to a conveying machine which appears fragmentarily in plan.

Fig. 4 is a fragmentary plan, partly in section, illustrating the mechanism at one side of the machine and underneath the conveyor.

Fig. 5 is a somewhat enlarged elevation of one of the adjusting mechanisms.

Figs. 6 and 7 are diagrammatic illustrations showing the paths of the transverse cutting wires with nozzles having differing dimensions in the direction of the traveling movement of said wires.

Fig. 8 is a fragmentary section showing the connection of the fingers 38 with the bar 36.

Like reference characters refer to like parts in the different figures of the drawings.

Figure 1:
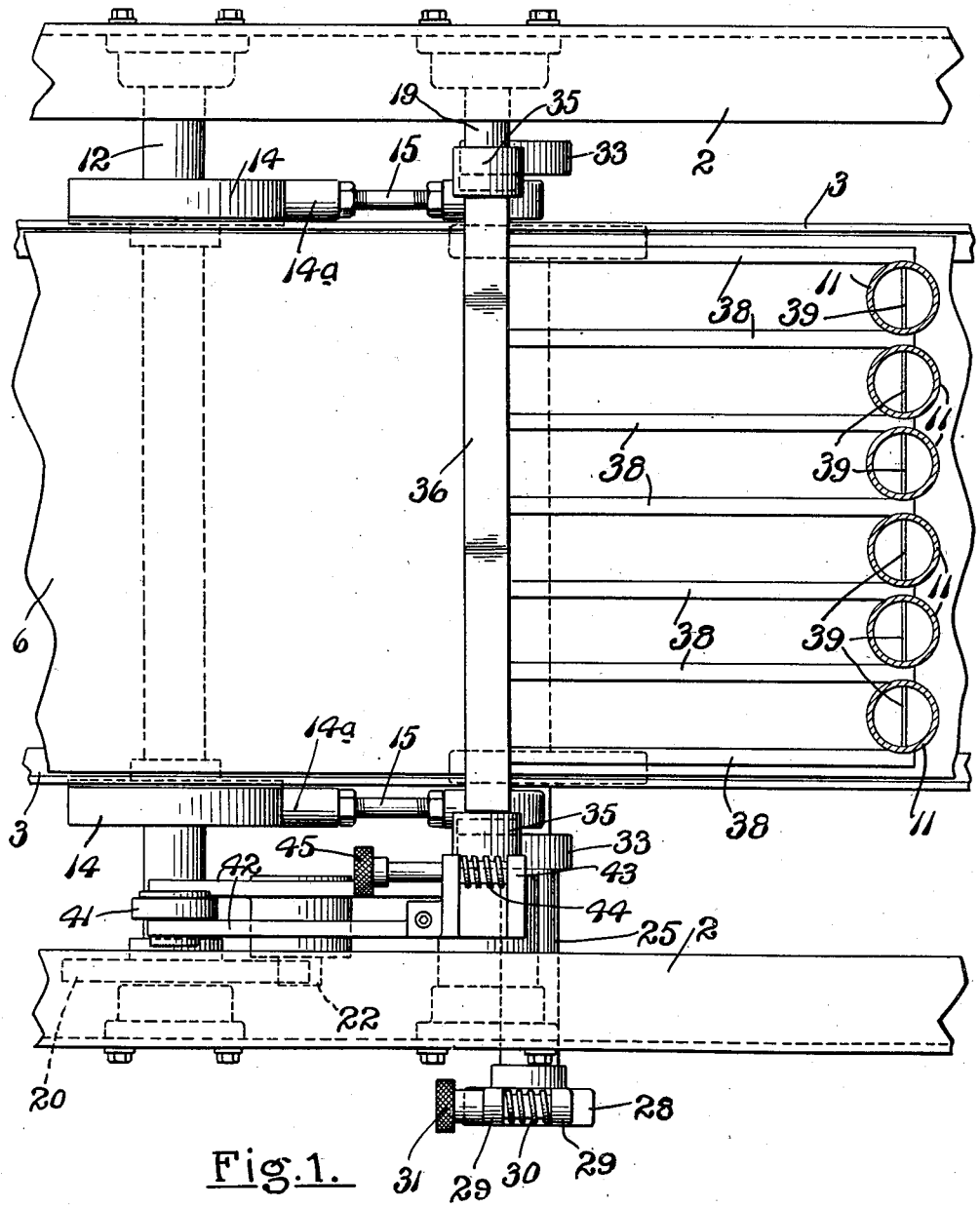

In the construction illustrated, vertical side supports 1 for the machine are provided spaced from each other, which at their upper ends have narrow top sections 2 at the sides of the machine, the machine being open between the adjacent edges of said sides. Spaced carrying tracks and guides 3 shown as of angle form are provided, between which trays 4 upon which the deposits 5 of dough cut fall by gravity are located on an endless belt conveyor 6 which, at its edge portions passes over the lower legs of the guides 3 between the vertical legs thereof.

A hopper 7 with inclined sides which receives the prepared dough 8 is provided near its lower end and at its sides with suitable driven compression and feed rollers 9 and 10, and at its lower end has delivery nozzles 11 secured thereto located transversely of the belt 6 and in alinement with each other, being spaced short distances apart as shown in Fig. 1. The cross section of the delivery nozzles 11 as thus shown are of circular form. But such shape may be readily varied and in practice a plurality of nozzles having different delivery forms will be used. In the operation the dough is forced continuously downward and outward at the open lower ends of the nozzles, as is evident.

A main drive shaft 12 is disposed between the sides 1 of the frame of the machine and is suitably mounted for rotation and driven in any desired conventional manner. In practice it is designed to be driven at different speeds, as may be selected as best for the differing conditions which are to be served. On said shaft toward each end thereof, but within the inner edges of the top parts 2, two spaced eccentrics 13 are secured surrounding each of which is an eccentric ring or housing 14 having a boss 14a extending to a side therefrom, with which a rod 15 is connected, in turn connected with a cross shaft 16a at each end of which is a guide block 16. The blocks 16 are received in generally vertical elongated slots 17 made in the lower end portions of generally vertical levers 18 which are mounted for rocking movement upon a cross shaft 19, located above and to a side of the drive shaft 12 and mounted at its ends on the sides 1 of the frame. There are two of the levers 18, one located inwardly a distance from each side of the frame and extending at their upper ends to a point substantially flush with the upper side of the top sections 2.

Figure 3:
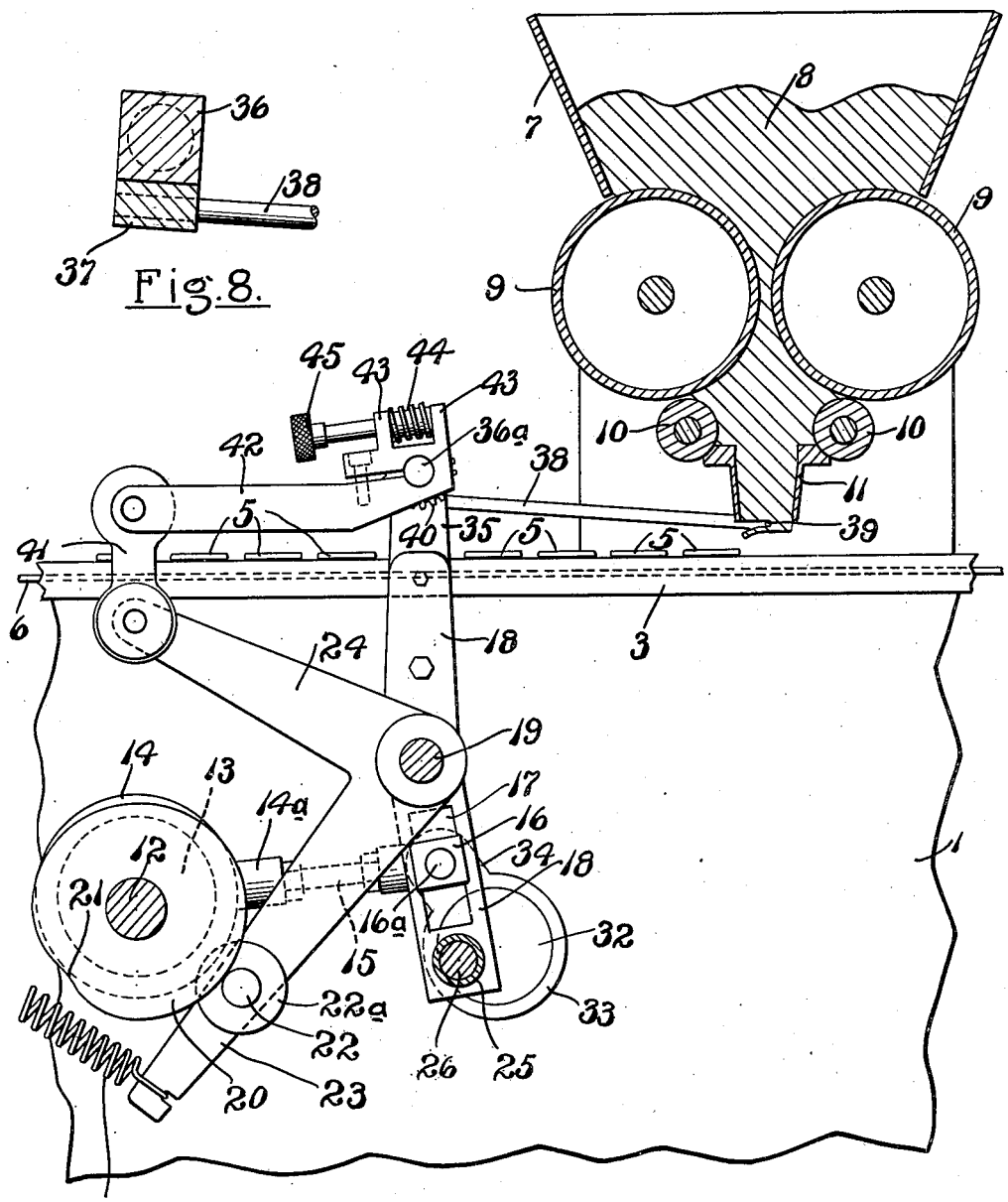
Fig. 3 is a fragmentary longitudinal section.

Likewise on the drive shaft 12 but adjacent one end only a cam 20 is secured. The cam at one side is provided with a concave recess 21 which is disposed between the ends of two sections of said cam each generally a half circle in length, one being of a somewhat shorter radius of curvature than the other. Diametrically opposite the depression at 21 the change from one circular section of the cam to the other of a larger radius is less abrupt and more gradual than at 21. The cam bears against a pin or roller 22 extending outwardly and between the ends of an arm 23 of a bell crank lever which is mounted for rocking movement upon the shaft 19, and has a second arm 24 extending upwardly as shown in Fig. 3. A coiled tension spring 23a, connected with the lower end of the arm 23, maintains the pin or roller 22 in engagement with the edges of the cam 20 at all times. It is apparent that upon a continuous rotation of the drive shaft 12 and consequent like rotation of the eccentric 13 and the cam 20, the levers 18 are rocked back and forth, the extent of rocking movement being governed by the position of the blocks 16 in the slots 17, and the bell crank lever 24 is likewise rocked about the axis of the shaft 19, but not in a uniform manner due to the shape of the cam 20.

A horizontal sleeve 25 is permanently secured to or integrally connected with and extends outwardly from the lower end of the lever 18 at the side of the machine at which the bell crank lever described is located, passing through an opening as shown at 1a (Fig. 4) in the adjacent side 1 of the machine frame. A shaft 26 is passed through said sleeve and extends across adjacent to the lower end of the opposite lever 18. At the outer end of the sleeve 25 a worm gear 27 is secured, housed within a housing 28 connected with the outer end of the sleeve 25, which housing is open at its upper side and has two spaced apart ears 29 with a shaft extending therethrough on which a worm 30 is secured and which may be manually turned by the head or knob 31 at an end of the worm shaft, to thereby turn the shaft 26. The shaft 26 has secured thereon two eccentrics 32 spaced a short distance from the lower end of each of the levers 18, around each of which is an eccentric housing 33 having an arm 34 radially extending therefrom and connected with the shaft 16a previously described. It is apparent that by turning the shaft 26, the eccentrics 32 and the housings associated therewith may be swung bodily about the axis of the shaft 26 and in this manner the blocks 16 made to move lengthwise of the slots 17 with a consequent increase or decrease of the effective lever arm distance between the axes of the shafts 19 and 16a to control the arc of swinging or rocking movement of the portions of the levers 18 above the shaft 19.

Figure 2:
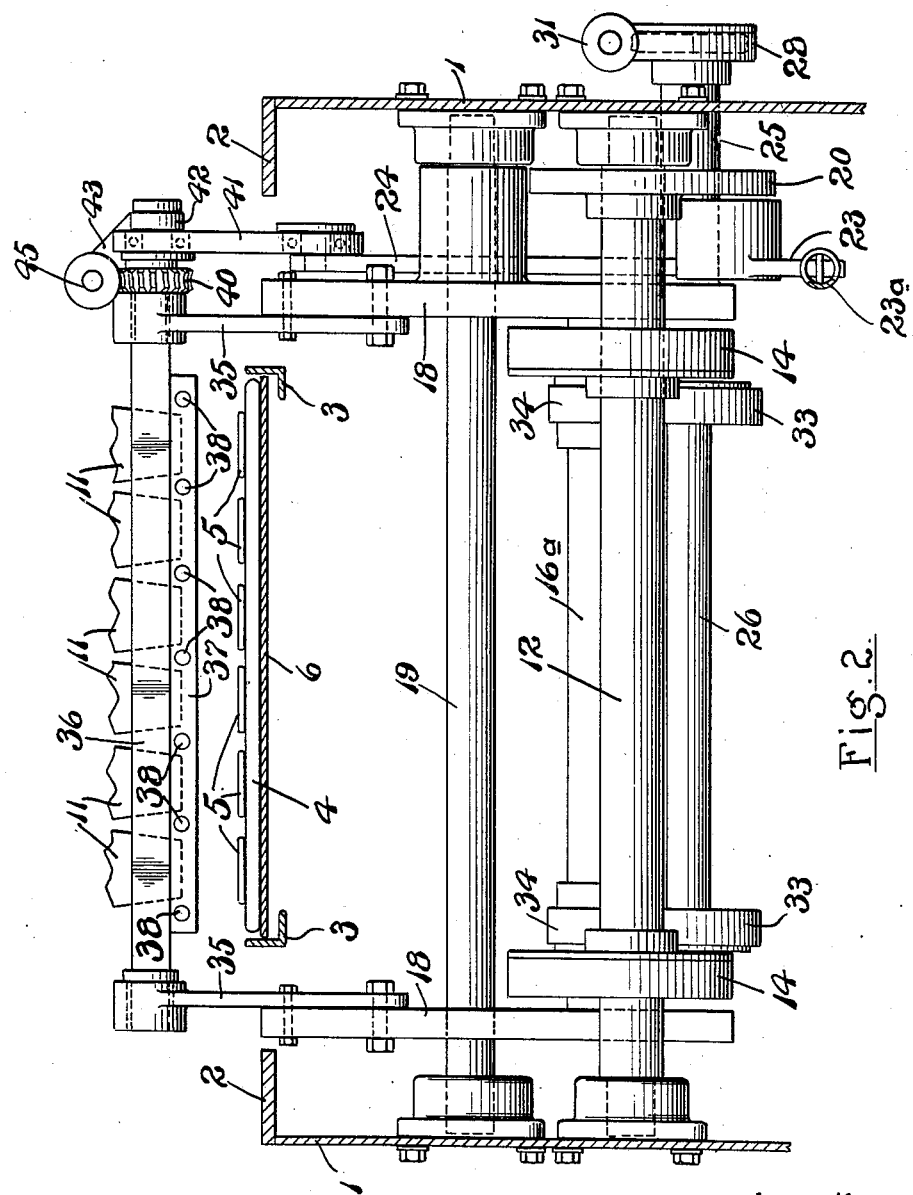
Fig. 2 is a transverse section therethrough.

A bar or arm 35 is secured to the upper end portion of each of the levers 18, extending thereabove. A horizontal bar 36 preferably square in cross section is machined to provide cylindrical projections 36a at each end which are received within bearings at the upper ends of the arms 35. At the lower side of the cross bar 36 a flat bar 37 is permanently secured from which elongated fingers 38 extend to the lower end portions of the nozzles 11, one at each side of each nozzle as shown in Fig. 2. A wire 39 horizontally positioned passes through all of the fingers 38 near their free end portions (see Fig. 1).

Said wire is designed to be moved across the lower ends of the delivery nozzles 11, and as is indicated in Fig. 3, cut projecting portions of the dough 8 which have been fed and forced below the horizontal plane of the lower ends of said nozzles.

At the outer side of the bearing of one of said arms 35, at the same side of the machine as the heretofore described bell crank lever, a worm gear 40 is secured to the cylindrical end portion 36a of the cross bar 36, (Fig. 2). At the upper end of the lever 24 a link 41 is pivotally connected at its lower end, and at its upper end has a pivotal connection to two generally horizontal bars 42 which extend to and are clamped to the part 36a (Fig. 3). Spaced ears 43 project upwardly from at least one of the bars 42 between which a worm 44 is rotatably mounted in engagement with the worm gear 40. The worm 44 is manually turned by turning the shaft upon which it is formed or mounted by engaging the knob 45 (Fig. 3).

The adjustment described is provided in order to closely and accurately position the dough cutting wire 39 so that it will move across the lower ends of the nozzles 11 and in not so high a position that it will strike thereagainst or at a too low position, in which the dough cutting would be ineffectively performed.

With this construction and with the shaft 12 continuously driven, it will be apparent that rods 15 are reciprocated with a consequent rocking of the levers 18 and a reciprocation of the fingers 38 so as to pass the cutting wire across the lower ends of the nozzles 11 and sever the projecting dough below the lower end of each nozzle, substantially as flat disks 5 (Fig. 2) which are deposited in a row on a pan 4 moving directly beneath and carried by the continuously moving endless conveyor belt 6. It will also be apparent that the bell crank lever, having the arms 23 and 24, is rocked about the shaft 19 with such rotation of the shaft 12. The position of the larger radius portion of the cam 20 is such that when it engages the pin 22, the cutting wire 29 will be lifted to an upper position and will be held in such position during the time that its passing across the lower ends of the nozzles 11, in other words, will follow substantially the paths indicated at a in Figs. 6 and 7. When the cam 20 has moved so as to bring the recess at 21 to the pin or roller 22, the cutting wire will have passed entirely across the lower end of the nozzles. The consequent rocking of the bell crank lever upon pin or roller 22 being drawn into the recess at 21 will lower the cutting wire at which time the wire will, by its engagement with the edges of the dough wafers 5, project them downwardly on to the pan 4, the wires taking the paths as shown substantially at b in Figs. 6 and 7. The return of the wires to their initial position will be first in paths below the lower ends of the nozzles 11 and 11a in Figs. 6 and 7, substantially following the paths indicated at c, this during the time that the smaller radius section of the cam has the pin or roller 22 bearing against it. The final movement of the cutting wire 39 will follow substantially the paths indicated at d in Figs. 6 and 7, as the pin or roller 22 moves from the smaller radius section of the cam to its larger radius section.

This insures that the cutting wire 39 will be withdrawn after it has done its cutting function when passing across the open lower ends of the nozzles in close proximity thereto, so as to be out of the way and below the dough which is forced outwardly at the lower ends of said nozzles during the time the cutting wire is returning to its initial position.

As shown in Figs. 6 and 7 the length of stroke of the fingers 38 which carry the wire 39 is shorter in Fig. 6 than in Fig. 7, in which Fig. 6 the dimension of the open end of the nozzle in the direction of movement of the wire 39 is shorter than the corresponding dimension with nozzle 11a. This is effected by changing the position of the blocks 16 in the slots 17 as previously described.

Such change in the length of stroke is to govern and control the length of the path indicated at a in Figs. 6 and 7, so that the cutting stroke will end and the inclined downward path at b begin with the cutting wire engaging or contacting the edge portions of the cut off wafer and project them downwardly simultaneously to the receiving pans below. It is evident that the portions of the cookie wafers initially cut will tend, under gravity, to incline or bend downwardly so that at the instant of complete severing the cookie wafers would occupy inclined positions with reference to the horizontal upper faces of the pans, and if merely severed and dropped by gravity would not strike the pans squarely at their under sides nor in substantially straight alined rows across the pans. With my invention, the last severed end portions of the cookie wafers are still in contact with the cutting wires and are actuated by them as said wires move downwardly in the inclined path indicated at b, with a correction of such inclination in position of the wafers, whereby they are deposited on the pans with their under sides horizontal upon striking the upper surfaces of the pans; and are likewise dropped not only by gravity but by a force imparted thereto by the severing wires. The adjustment of the stroke length provided by the manual operation of the worm 44 is one capable of very fine regulation, and may be and is done with the machine in operation, so that if there is not the right depositing of the wafers it is corrected and made exact and accurate with the machine in operation.

The construction described is very practical and useful and has proved economical in use because of the very large quantity processing of dough which may be obtained. The continuous movement of the trays 5 insures that the rows of cookie blanks of dough across the trays shall be substantially evenly spaced, the process being continuous and rapid.

The invention is defined in the appended claims and is to be considered comprehensive of all forms of structure coming within their scope.

We claim:

1. In a machine as described, a movable conveyor located in a substantially horizontal plane, a hopper for containing dough located above said conveyor having a nozzle with an open lower end, means for continuously extruding dough under pressure at the lower open end of said nozzle, two substantially vertical levers pivotally mounted between their ends, one at each side of the conveyor, and extending at their upper ends thereabove, a main drive shaft adapted to be continuously driven, means connecting said shaft with said levers for rocking the levers back and forth about their pivotal axis, a bar mounted for rocking movement located between and connected to said levers at their upper end portions, fingers secured to said bar and extending to the nozzle, a wire carried by said fingers adjacent their free ends, a pivotally mounted bell crank lever, a cam on the drive shaft, a member carried by one arm of the bell crank lever to bear against the cam, yielding means for drawing said member into such engagement, a link clamped at one end to one end of the finger carrying bar, and a second link connecting the other end of the bell crank lever and the opposite end of the first link as specified.

2. A construction as defined in claim 1, said first link at its upper side and above the end of the finger carrying bar having upwardly extending ears, a manually operable worm rotatably mounted on and between said ears, a worm gear with which said worm engages secured to said finger carrying bar, and means for releasably clamping said first link to the end of said finger carrying bar.

3. In a machine as described, a horizontally positioned conveyor adapted to be moved in the direction of its length, a dough receiving hopper mounted above the conveyor having a nozzle with an open lower end located at the bottom of the hopper, means for continuously extruding dough under pressure from said hopper through said nozzle, two levers one at each side of the conveyor and to one side of the hopper pivotally mounted between their ends to turn about a common axis, each having an upper arm extending above the conveyor, a bar carried by and located between the upper end portions of said arms, fingers connected each at one end to said bar and extending to said nozzle, a transverse wire carried by said fingers adjacent their free ends, a drive shaft adapted to be continuously operated, an eccentric thereon, an eccentric housing around the eccentric, a second shaft extending between said levers below the pivotal axis thereof, said levers having vertical elongated slots therein, a block slidably mounted in each slot, said second shaft passing through said blocks, connections between said second shaft and said eccentric housing whereby said levers are rocked back and forth about their pivotal axis on rotation of the drive shaft, a sleeve extending laterally from the lower end of one of said levers, a third shaft passing through said sleeve and through the lower end portions of both levers, two eccentrics connected with said third shaft one adjacent the lower end of each of said levers and an eccentric housing around each of said eccentrics, each of said housings having an arm connected with said second shaft, as specified.

4. A construction as defined in claim 3, said finger carrying bar being rotatably mounted at the upper ends of said levers, a bell crank lever pivotally mounted to turn about the same pivotal axis as the first mentioned levers, a cam on the drive shaft, a member carried by one arm of the bell crank lever bearing against the cam, spring means for holding said member in engagement with the cam, a link releasably clamped at one end to an end of the finger carrying bar, and a second link connecting the end of the other arm of the bell crank lever with the opposite end of the first mentioned link.

5. In a construction as described, a hopper for receiving dough, a nozzle at the lower end of said hopper having an outlet opening at its lower end, means for forcing the dough through said nozzle and outwardly at said opening, a pair of spaced generally vertical levers pivotally mounted between their ends at one side of said hopper, a horizontal cross bar between the upper ends of said levers, fingers secured at one end to the cross bar and extending in a generally horizontal direction toward the lower end of said nozzle, a horizontal wire attached to the free end portions of said fingers, means for rocking said levers about their pivotal axes to reciprocate the fingers and successively move said wire across the lower open end of the nozzle and cut dough extruded therefrom in successive thin wafers, said levers at the lower end portion below the pivots thereof having vertically disposed slots therein, a continuously operating drive shaft, blocks adjustably mounted in said slots, means connecting said blocks and drive shaft for rocking said levers about their pivotal axes, and means for simultaneously manually adjusting said blocks to different positions in their respective slots to control the length of stroke of said fingers and cutting wire carried thereby.

6. A machine as described comprising, a frame, a nozzle, an arm pivotally mounted on the frame, a cutter pivotally mounted on the swinging end of the arm and extending adjacent said nozzle, means for oscillating said arm, a lever pivotally connected to the frame, a cam operating in synchronism with said arm, a cam follower engaging said cam and actuating said lever and a link connected at one end to a swinging part of said lever and connected at its other end to said cutter at a point spaced from the pivotal mounting thereof, said cam acting to control the path of movement of said cutter.

7. A machine as described comprising, a frame, a nozzle, an arm pivotally mounted on the frame, a cutter pivotally mounted on the swinging end of said arm and extending adjacent said nozzle, a shaft rotatably mounted in the frame, a cam on said shaft, a link connected at one end to said cutter at a point spaced from the pivotal mounting thereof, the other end of said link being actuated by said cam, an eccentric on said shaft, a connecting rod having one end operatively connected with said eccentric and having its other end slidably connected with said arm, means for adjusting said slidable connection radially of the pivot of said arm, said means for adjusting said slidable connection comprising a second eccentric mounted on said arm, a ring surrounding said second eccentric and actuated thereby, said ring being connected to said slidable connection, and means for rotatably adjusting said second eccentric relative to said arm.

FRANK CHARLES WERNER.
DICK SPORTE.

REFERENCES CITED

The following references are of record in the file of this patent:

UNITED STATES PATENTS

| Number | Name | Date |
|---|---|---|
| 209,365 | Smith | Oct. 29, 1878 |
| 911,851 | Tucker | Feb. 9, 1909 |
| 1,578,905 | Moores | Mar. 30, 1926 |
| 1,900,607 | Kremmling (1) | Mar. 7, 1933 |
| 1,932,345 | Kremmling (2) | Oct. 24, 1933 |
| 2,162,145 | Werner | June 13, 1939 |

FOREIGN PATENTS

| Number | Country | Date |
|---|---|---|
| 618,521 | France | Dec. 16, 1926 |